(No Model.)
J. P. B. FISKE.
METHOD OF TRANSMISSION OF ELECTRICITY.
No. 516,804.  Patented Mar. 20, 1894.
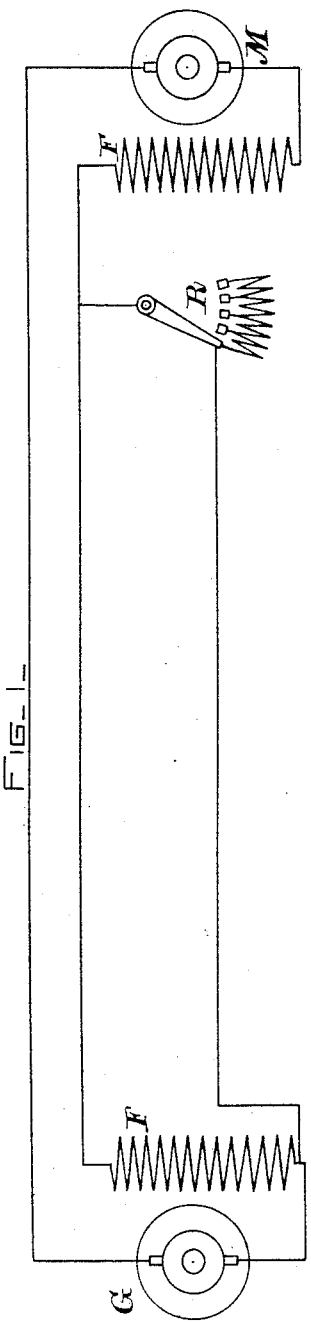
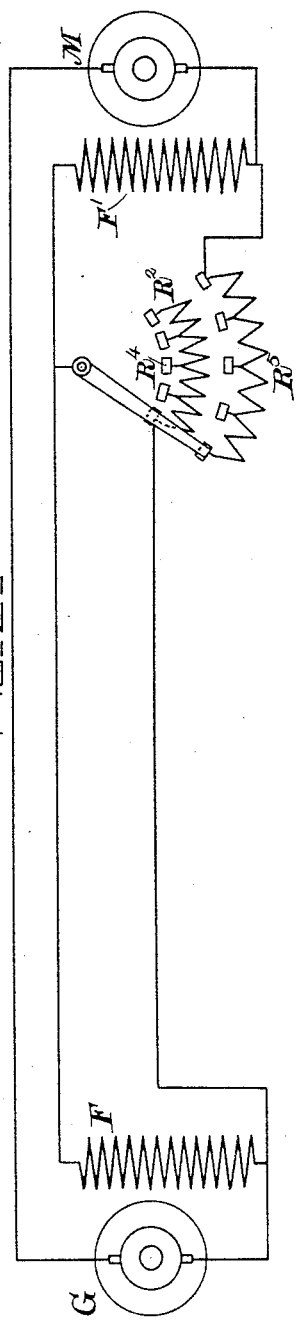
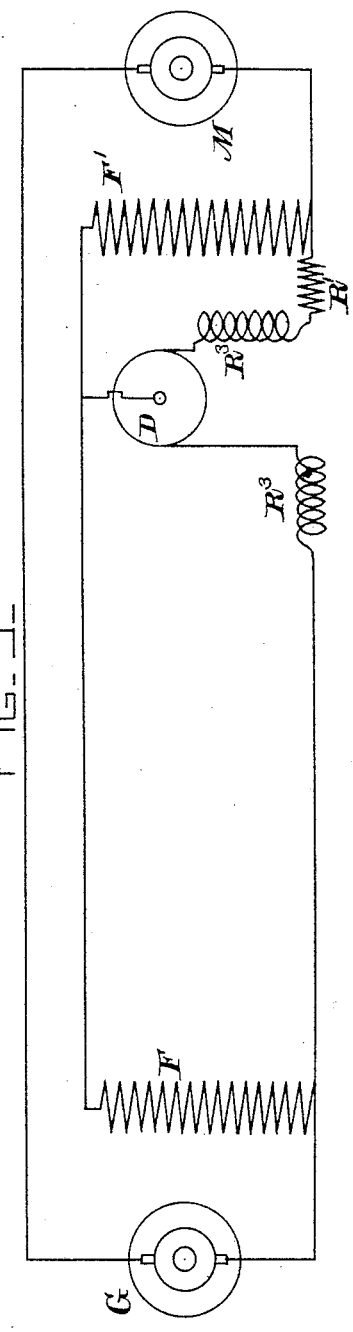

UNITED STATES PATENT OFFICE.

JONATHAN P. B. FISKE, OF LYNN, MASSACHUSETTS, ASSIGNOR TO THE GENERAL ELECTRIC COMPANY, OF NEW YORK.

METHOD OF TRANSMISSION OF ELECTRICITY.

SPECIFICATION forming part of Letters Patent No. 516,804, dated March 20, 1894.

Application filed May 3, 1893. Serial No. 472,832. (No model.)

*To all whom it may concern:*

Be it known that I, JONATHAN P. B. FISKE, a citizen of the United States, residing at Lynn, in the county of Essex and State of Massachusetts, have invented certain new and useful Improvements in Methods of Transmission of Electricity, of which the following is a specification.

My invention relates to power transmission, where the motor and generator are in series. In former methods it has been customary to provide two series machines connected in series, which arrangement provides a constant speed of motor irrespective of load, provided the generator runs at constant speed and the fields are practically of the same character, differing only in that the field of the generator has a slightly higher rate of magnetization than that of the motor, in order to provide for the drop of potential due to the resistance of the line and the machines. The use of such an arrangement, however, is comparatively limited, as it only provides for a constant speed, while it is essential in most instances to have a variable speed of the motor. I have provided means for employing series dynamos and motors with all of the inherent advantages of this type of machine, while securing at the same time the essential variation of speed in the motor.

The system which I adopt consists in varying the field-magnet strength of either the generator or the motor both being series machines, or for extreme variations of speed the field magnet strength of both may be varied; and my invention consists in methods of so varying the field-magnet strengths and in apparatus effecting such variations.

In the accompanying drawings hereby referred to and made part of this specification, like letters refer to like parts; and therein Figures 1 to 3 show conventional diagrammatic representations of the means which I adopt to effect the purposes of my invention.

Referring by letter in Fig. 1, G is a generating armature, F is its field-coil, R is a rheostat, F' is the field-coil of the motor and M is its rotating armature. It is understood throughout that the current and speed of the generator remain constant; and in the figure under discussion the speed of the motor is affected by varying the field magnet strength of the generator, which is effected by the rheostat R, the field-magnet strength of the motor being constant as therein shown. In the position of the rheostat arm shown in Fig. 1, the field-magnet F of the generator is short circuited, and the motor gets no current. By turning the rheostat arm to the right, resistance is gradually interposed in the shunt circuit around the field magnet F of the generator, and the machine begins to generate an electro-motive force, which is transmitted over the line to a motor, causing it to rotate at a speed dependent upon the position of the rheostat arm and the consequent strength of the field magnet F and electro-motive force of generator G.

It will be found that by this means any desired speed of the motor within certain limits may be maintained, the current remaining constant at the point necessary to give the required torque. It is manifest that the rheostat may be placed at any convenient position, and in the drawings it is shown located at the motor, so as to be readily accessible to the operator at the motor. It is manifest that the rheostat may be placed at any convenient position near the work to be done, if desired.

In the arrangements described I provide for all speeds of the motor, even the slowest, by varying the generator field; at the lowest speeds of the motor, this gives such a weak field in the generator as to cause sparking at the commutator if a large current is taken therefrom. To obviate this difficulty, and at the same time to provide for a larger number of speeds in the motor with the same apparatus, I may vary simultaneously and oppositely the field-magnet strength of both the motor and the generator. Suitable arrangements adapted to this end are shown in Figs. 2 and 3, of the drawings.

Referring to Fig. 2, I interpose in the circuit a double rheostat $R^2$ having independent resistances as shown in the figure. The resistance $R^4$ adapted to vary the field of the generator is arranged in inverse relation to a second resistance $R^5$, adapted to vary resistance in the motor field; as will be observed in the figure. In the position of rheostat arm shown the generator field is short-circuited and the electro-motive force is therefore reduced to zero, while the motor field F' is at its maximum strength. Moving the arm to the right allows a small current to pass through the generator field F, at the same time weakening the field of the motor and so on until the extreme position to the right is reached, when the motor field is short-circuited and the maximum potential of the generator is brought into play. A form of rheostat peculiarly adapted to effect this simultaneous inverse regulation of the field strengths is shown in Fig. 3. Herein R' is a fixed resistance and $R^3$ is a continuous resistance wire understood to be a bare wire wound spirally on drum D as in the well known Wheatstone's rheostat. By rotating the drum this resistance $R^3$ may be thrown upon one side or the other of the circuit, and it will be manifest that as it is withdrawn from one side it is inserted in the other thus effectually regulating the speed, and forming in effect a modified slide-wire resistance.

As it is not desirable that the motor field should ever be reduced to an absolute zero, a small constant resistance, such as that indicated by R' in Fig. 3 is always to be left in circuit, which acts to give a field of at least a small intensity at all times.

In a divisional application, Serial No. 488,663, filed October 19, 1893, prepared from this application I have shown apparatus designed to effect the objects of my invention by varying the active length of the field-magnet coils, which also I believe to be broadly new, but do not claim herein.

Many changes which would readily suggest themselves to electricians might be made in the details of my invention; I therefore do not wish to limit myself to the particular arrangements herein described although I claim these to be broadly new, but

What I claim, and wish to protect by Letters Patent of the United States, is—

1. The method of regulating the speed of a series motor herein shown and described, which consists in varying the strength of the field of the generator supplying current to the motor, substantially as described.

2. The method of regulating the speed of a series wound electric motor as herein described, which consists in varying the electro-motive force of the generator supplying current to the motor, substantially as described.

3. The method of regulating an electric motor as herein described, which consists in simultaneously and inversely varying the field-magnet strengths of the generator supplying current and the motor receiving it.

4. The combination as herein described and set out of two series dynamo-machines connected in series, one a generator and the other a motor, and means for regulating the speed of the motor consisting of a resistance arranged to vary the field magnet strength of the generator, substantially as set forth and described herein.

5. In combination, a series generator driving a series motor and a double rheostat in the circuit between them adapted to vary the field-magnet strengths of the generator and the motor inversely, substantially as set out and described herein.

6. In combination, a series generator, a series motor and a slide wire rheostat adapted to vary inversely the field magnet strengths of the generator and the motor, substantially as herein described and set out.

7. In combination, a series generator, a series motor, and means, substantially as described, located at or near the motor and adapted to vary the field-magnet strength of the generator and thus vary the speed of the motor.

In witness whereof I have hereunto set my hand this 1st day of May, 1893.

JONATHAN P. B. FISKE.

Witnesses:
JOHN W. GIBBONEY,
BENJAMIN B. HULL.